US011332203B2

(12) United States Patent
Senatro et al.

(10) Patent No.: US 11,332,203 B2
(45) Date of Patent: May 17, 2022

(54) AERODYNAMIC TRUCKING SYSTEMS

(71) Applicant: Strehl, LLC, Phoenix, AZ (US)

(72) Inventors: Richard P. Senatro, Scottsdale, AZ (US); Christian Lee, Pooler, GA (US); Daniel J. McCormack, Rincon, GA (US); John Jones, Savannah, GA (US)

(*) Notice: Subject to any disclaimer, the term of this patent is extended or adjusted under 35 U.S.C. 154(b) by 148 days.

(21) Appl. No.: 16/811,635

(22) Filed: Mar. 6, 2020

(65) Prior Publication Data
US 2020/0231226 A1 Jul. 23, 2020

Related U.S. Application Data

(63) Continuation-in-part of application No. 16/211,648, filed on Dec. 6, 2018, now Pat. No. 10,829,168, and a continuation-in-part of application No. 16/741,886, filed on Jan. 14, 2020, which is a continuation of application No. 15/958,342, filed on Apr. 20, 2018, now Pat. No. 10,583,873, which is a continuation of application No. 15/277,172, filed on Sep. 27, 2016, now Pat. No. 9,975,583, which is a continuation of application No. 14/935,647, filed on Nov. 9, 2015, now Pat. No. 9,751,573, which is a continuation of application No. 14/247,504, filed on Apr. 8, 2014, now Pat. No. 9,211,919, which is a continuation of application No. 13/633,013, filed on Oct. 1, 2012, now Pat. No. 8,727,425, which is a continuation-in-part of application No. 13/117,891, filed on May 27, 2011, now Pat. No. 8,303,025, said application No. 16/211,648 is a continuation of application No. 15/279,858, filed on Sep. 29, 2016, now Pat. No. 10,189,514.

(60) Provisional application No. 62/814,411, filed on Mar. 6, 2019, provisional application No. 62/234,403, filed on Sep. 29, 2015, provisional application No. (Continued)

(51) Int. Cl.
*B62D 35/00* (2006.01)
*B62D 35/02* (2006.01)

(52) U.S. Cl.
CPC ......... *B62D 35/001* (2013.01); *B62D 35/008* (2013.01); *B62D 35/02* (2013.01); *Y02T 10/82* (2013.01); *Y02T 10/88* (2013.01); *Y10S 180/903* (2013.01)

(58) Field of Classification Search
CPC .. B62D 35/001; B62D 35/002; B62D 35/008; B62D 35/02; B62D 37/02
USPC .......... 296/180.1, 180.2, 180.3, 180.4, 181.2
See application file for complete search history.

(56) References Cited

U.S. PATENT DOCUMENTS 4,566,678 A 1/1986 Anderson
4,611,847 A 9/1986 Sullivan
(Continued)

FOREIGN PATENT DOCUMENTS

WO 2004062953 A2 7/2004
WO 2004087449 A2 10/2004
(Continued)

*Primary Examiner* — Jason S Daniels
(74) *Attorney, Agent, or Firm* — Noblitt & Newson, PLLC

(57) ABSTRACT

An aerodynamic fairing assembly for attachment to a trailer of a tractor-trailer. The aerodynamic fairing assembly may comprise a front skirt fairing and a movable skirt fairing that is configures to move forward and rearward along the length of the trailer. The front skirt faring and movable skirt fairing are coupled to the trailer by one or more mounting brackets.

23 Claims, 6 Drawing Sheets

Related U.S. Application Data

61/639,830, filed on Apr. 27, 2012, provisional application No. 61/374,572, filed on Aug. 17, 2010, provisional application No. 61/349,183, filed on May 27, 2010.

(56) References Cited

U.S. PATENT DOCUMENTS

| | | | |
|---|---|---|---|
| 4,746,160 A | 5/1988 | Wiesemeyer | |
| 5,280,990 A | 1/1994 | Rinard | |
| 6,079,769 A | 6/2000 | Fannin et al. | |
| 6,260,911 B1 | 7/2001 | Becker | |
| 6,644,720 B2 | 11/2003 | Long et al. | |
| 6,827,372 B2 | 12/2004 | Barr et al. | |
| 6,837,536 B1 | 1/2005 | Schwartz | |
| 6,974,178 B2 | 12/2005 | Ortega et al. | |
| 7,008,005 B1 | 3/2006 | Graham | |
| 7,093,889 B2 | 8/2006 | Graham | |
| 7,163,258 B2 | 1/2007 | Dyer, II et al. | |
| 7,404,592 B2 | 7/2008 | Reiman et al. | |
| 7,497,502 B2 | 3/2009 | Wood | |
| 7,578,541 B2 | 8/2009 | Layfield et al. | |
| 7,578,542 B2 | 8/2009 | Layfield et al. | |
| 7,604,284 B2 | 10/2009 | Reiman et al. | |
| 7,686,385 B2 | 3/2010 | Dolan | |
| 7,748,772 B2 | 7/2010 | Boivin et al. | |
| 7,780,224 B2 | 8/2010 | Roush | |
| 7,887,120 B2 | 2/2011 | Boivin et al. | |
| 7,938,475 B2 | 5/2011 | Boivin et al. | |
| 7,942,467 B2 | 5/2011 | Boivin et al. | |
| 7,942,468 B2 | 5/2011 | Boivin et al. | |
| 7,942,469 B2 | 5/2011 | Boivin et al. | |
| 7,942,470 B2 | 5/2011 | Boivin et al. | |
| 7,942,471 B2 | 5/2011 | Boivin et al. | |
| 8,292,351 B2 | 10/2012 | Boivin et al. | |
| 8,322,778 B1 * | 12/2012 | Pfaff | B62D 35/001 296/180.4 |
| 8,449,017 B2 | 5/2013 | Boivin et al. | |
| 8,678,474 B1 | 3/2014 | Boivin et al. | |
| 8,727,425 B1 * | 5/2014 | Senatro | B62D 35/001 296/180.4 |
| 8,979,172 B2 | 3/2015 | Reiman et al. | |
| 9,004,575 B2 | 4/2015 | Grandominico et al. | |
| 9,669,883 B2 | 6/2017 | Bassily et al. | |
| 9,669,884 B2 | 6/2017 | Bassily et al. | |
| 2006/0152038 A1 | 7/2006 | Graham | |
| 2007/0120397 A1 | 5/2007 | Layfield et al. | |
| 2008/0061597 A1 | 3/2008 | Reiman et al. | |
| 2008/0061598 A1 | 3/2008 | Reiman et al. | |
| 2008/0093887 A1 | 4/2008 | Wood | |
| 2008/0296930 A1 | 12/2008 | Roush et al. | |
| 2009/0212595 A1 | 8/2009 | Heppel et al. | |
| 2009/0212596 A1 | 8/2009 | Reiman et al. | |
| 2010/0096880 A1 | 4/2010 | Boivin et al. | |
| 2010/0096881 A1 | 4/2010 | Boivin et al. | |
| 2010/0096882 A1 | 4/2010 | Boivin et al. | |
| 2010/0096883 A1 | 4/2010 | Boivin et al. | |
| 2010/0098481 A1 | 4/2010 | Boivin et al. | |
| 2010/0264690 A1 | 10/2010 | Brown et al. | |
| 2011/0062749 A1 | 3/2011 | Graham et al. | |
| 2011/0089716 A1 | 4/2011 | Hall | |
| 2011/0148142 A1 | 6/2011 | Kint | |
| 2011/0297035 A1 | 12/2011 | Langerwisch et al. | |
| 2012/0091754 A1 * | 4/2012 | Lee | B62D 35/001 296/180.4 |
| 2012/0153668 A1 | 6/2012 | van Raemdonck | |
| 2013/0076064 A1 * | 3/2013 | Smith | B62D 35/001 296/180.1 |
| 2013/0106135 A1 | 5/2013 | Fraskovsky et al. | |
| 2014/0217776 A1 | 8/2014 | Senatro | |
| 2014/0265438 A1 | 9/2014 | Kronemeyer | |
| 2015/0015027 A1 | 1/2015 | Wirth | |
| 2015/0015029 A1 | 1/2015 | Wiegel | |
| 2016/0121940 A1 | 5/2016 | Courtney et al. | |

FOREIGN PATENT DOCUMENTS

| | | |
|---|---|---|
| WO | 2013043890 A1 | 3/2013 |
| WO | 2017059023 A1 | 4/2017 |

* cited by examiner

AERODYNAMIC TRUCKING SYSTEMS

CROSS-REFERENCES TO RELATED APPLICATIONS

The present application claims the benefit of U.S. Provisional Application Ser. No. 62/814,411, filed Mar. 6, 2019, entitled "METHODS AND APPARATUS FOR AN AERODYNAMIC TRUCKING SYSTEM" and is a continuation in part of U.S. Nonprovisional patent application Ser. No. 16/211,648 filed Dec. 6, 2018 entitled "AERODYNAMIC TRUCKING SYSTEMS", which is a continuation of U.S. Nonprovisional patent application Ser. No. 15/279,858 filed on Sep. 29, 2016, now U.S. Pat. No. 10,189,514 and claims the benefit of U.S. Provisional Application Ser. No. 62/234,403, filed Sep. 29, 2015, entitled "METHODS AND APPARATUS FOR AN AERODYNAMIC TRUCKING SYSTEM" and is a continuation in part of U.S. Nonprovisional patent application Ser. No. 16/741,886 filed Jan. 14, 2020 entitled "AERODYNAMIC TRUCKING SYSTEMS", which is a continuation of U.S. Nonprovisional patent application Ser. No. 15/958,342 filed Apr. 20, 2018 entitled "AERODYNAMIC TRUCKING SYSTEMS", which is a continuation of U.S. Nonprovisional patent application Ser. No. 15/277,172 filed Sep. 27, 2016, now U.S. Pat. No. 9,975,583 entitled "AERODYNAMIC TRUCKING SYSTEMS", which is a continuation of U.S. Nonprovisional patent application Ser. No. 14/935,647 filed Nov. 9, 2015, now U.S. Pat. No. 9,751,573 entitled "AERODYNAMIC TRUCKING SYSTEMS", which is a continuation of U.S. Nonprovisional patent application Ser. No. 14/247,504, filed Apr. 8, 2014, now U.S. Pat. No. 9,211,919 entitled "AERODYNAMIC TRUCKING SYSTEMS", which is a continuation of U.S. Nonprovisional patent application Ser. No. 13/633,013 filed Oct. 1, 2012, now U.S. Pat. No. 8,727,425 entitled, "AERODYNAMIC TRUCKING SYSTEMS", which claims the benefit of U.S. Provisional Application Ser. No. 61/639,830, filed Apr. 27, 2012, entitled "AERODYNAMIC TRUCKING SYSTEMS" and which is a continuation-in-part of U.S. Nonprovisional patent application Ser. No. 13/117,891 filed May 27, 2011, now U.S. Pat. No. 8,303,025 entitled "AERODYNAMIC TRUCKING SYSTEMS", which claims the benefit of U.S. Provisional Application Ser. No. 61/349,183, filed May 27, 2010, entitled "AERODYNAMIC TRUCKING SYSTEMS"; and, which claims the benefit of U.S. Provisional Application Ser. No. 61/374,572, filed Aug. 17, 2010, entitled "AERODYNAMIC TRUCKING SYSTEMS"; and incorporates the disclosure of each application by reference. To the extent that the present disclosure conflicts with any referenced application, however, the present disclosure is to be given priority.

BACKGROUND OF THE TECHNOLOGY

This technology relates to aerodynamic trucking systems. More particularly, this technology relates to providing a system of aerodynamic apparatus configured to minimize aerodynamic drag and maintain smoother air flow over highway-operated vehicles, particularly long-haul tractor-trailer vehicles.

Most large long-haul cargo trailers exhibit less than optimal aerodynamic performance during highway operation. At highway speeds, conventional trailers develop a substantial amount of turbulent airflow in the region between the axles below the trailer box. This turbulence results in significant aerodynamic drag, increasing both fuel consumption and Nitrogen Oxide (NOx) emissions at the motorized towing vehicle. Additionally, temporarily sustained vibration of external vehicle surfaces due to transient wind-force loading is often associated with premature wear, noise, and early failures within such aerodynamic vehicle structures. A system and method to improve the aerodynamic performance of long-haul transport vehicles in the above-noted areas is described below.

SUMMARY OF THE TECHNOLOGY

An aerodynamic fairing assembly for attachment to a trailer of a tractor-trailer having a top, bottom, front, rear, a pair of sides, a trailer frame having a centerline, transverse structural support members extending between sides of the trailer, and longitudinal members extending along a length of the trailer, and a bogie having a rear frame and at least one rear wheel assembly situated below the trailer frame. The aerodynamic fairing assembly may comprise a front skirt fairing and a movable skirt fairing.

The front skirt fairing may comprise a front cap and a side skirt fairing. The side skirt fairing may substantially straight and runs parallel to the centerline of the trailer or be angled outwardly from the centerline from the front to the rear of the trailer. The movable skirt fairing may comprise a front panel, a wheel panel, and a rear panel and is configured to move forward and rearward along the length of the trailer. The movable fairing may be coupled to the rear frame of the bogie. The front panel may be angled inwardly toward the centerline of the trailer from a rear edge to a front edge of the front panel. The front edge of the front panel may be covered or uncovered by a rear edge of the side skirt fairing, and wherein the movable skirt The aerodynamic fairing assembly may further comprise an exit fairing system. The exit fairing system may comprise a forward panel, a transition, and a rear panel. The forward panel may coupled to a pair of side panels and a top panel of the trailer and the rear panel is coupled to a rear door frame of the trailer.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of materials, connectors, panel, mounts, and the like for aerodynamic trucking systems, and the system described is merely one exemplary application for the technology.

Methods and apparatus for providing an aerodynamic trucking system designed to reduce aerodynamic drag and maintain smoother air flow over highway-operated vehicles, particularly long-haul tractor-trailer vehicles. Various representative implementations of the present technology may be applied to any system for reducing aerodynamic drag and maintaining smoother air flow over highway-operated vehicles, particularly long-haul tractor-trailer vehicles.

Generally an undercarriage of a conventional cargo trailer is comprised of groupings of various drag-producing components, which generally reside below a cargo-supporting floor deck, customarily having a rectangular shape. The drag-producing components of a semi-type cargo trailer undercarriage customarily include longitudinal and transverse structural support members, rear axles, brake components, mud flaps, wheels, tires, etc. Each aerodynamic skirt fairing functions to direct air away from the central regions of the trailer undercarriage, which contain the majority of such drag-producing components. Such directional control of airflow during transport operations reduces the parasitic drag-producing interactions between the air and the above-noted structures. More specifically, aerodynamic skirt fairings of aerodynamic trucking system are preferably designed to reduce aerodynamic drag by promoting a more continuous laminar air flow along the sides of cargo trailer.

Despite a general conformity of van-type trailer designs within the trailer industry, variations exist between the offerings of the various trailer manufacturers. Aerodynamic trucking systems are typically designed to be universally adaptable to most conventional semi-type cargo trailers. To accommodate specific aerodynamic variations within the various trailer configurations, each aerodynamic skirt fairing system may be designed to be adjustably mountable to the undercarriage of the cargo trailer. The adjustment feature within the system embodiments allows an installer to optimize the aerodynamic performance of an installed aerodynamic skirt fairing system based on the unique aerodynamic requirements of a specific vehicle platform. Furthermore, the aerodynamic trucking system may be designed to have a skirt that may cover or be located with the wheels and movable with the wheels while also maintaining suitable side skirt configurations.

Figure 1:
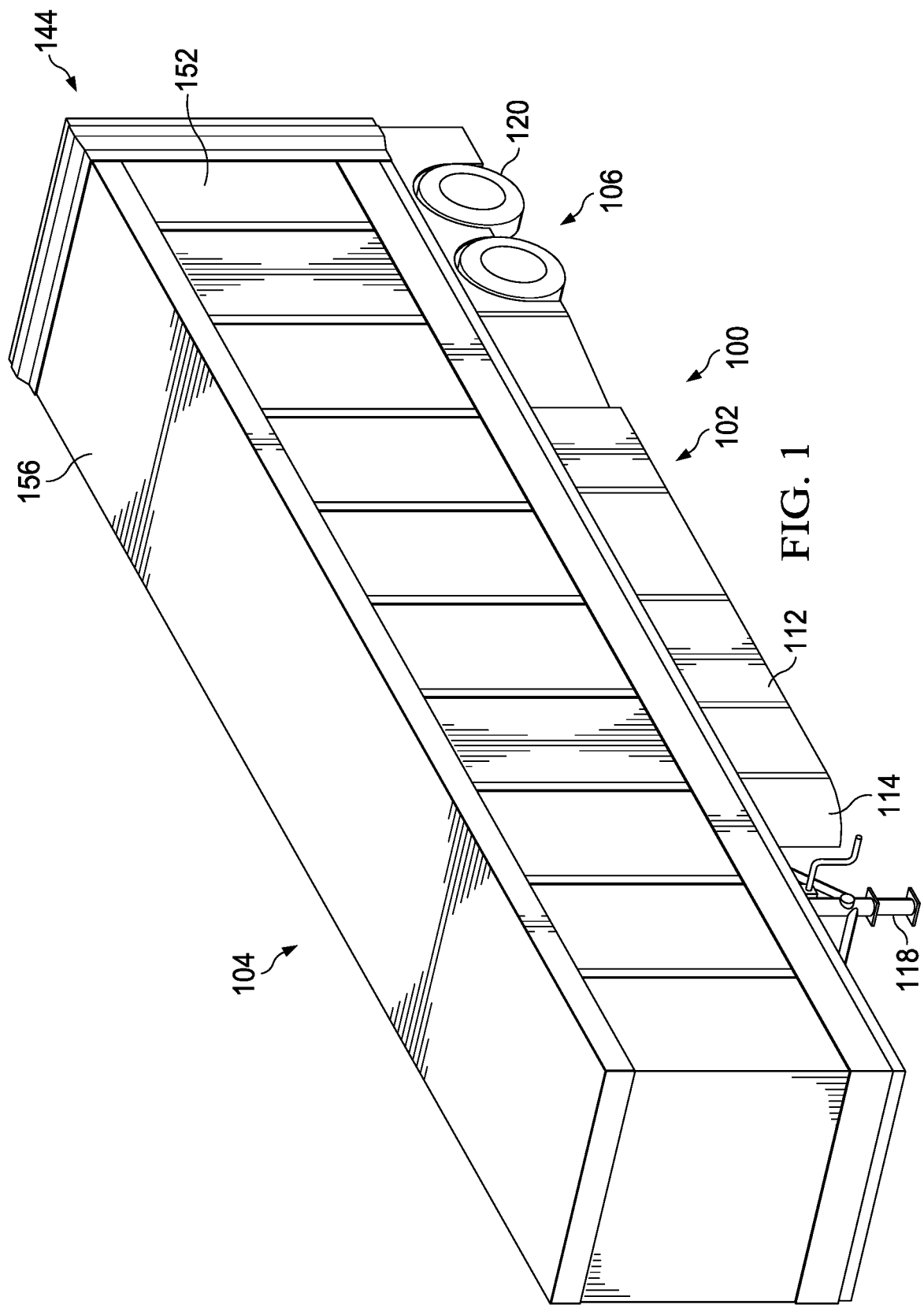
FIG. 1 representatively illustrates a perspective view of a trailer with an aerodynamic trucking system in accordance with an exemplary embodiment of the present technology.
Figure 2:
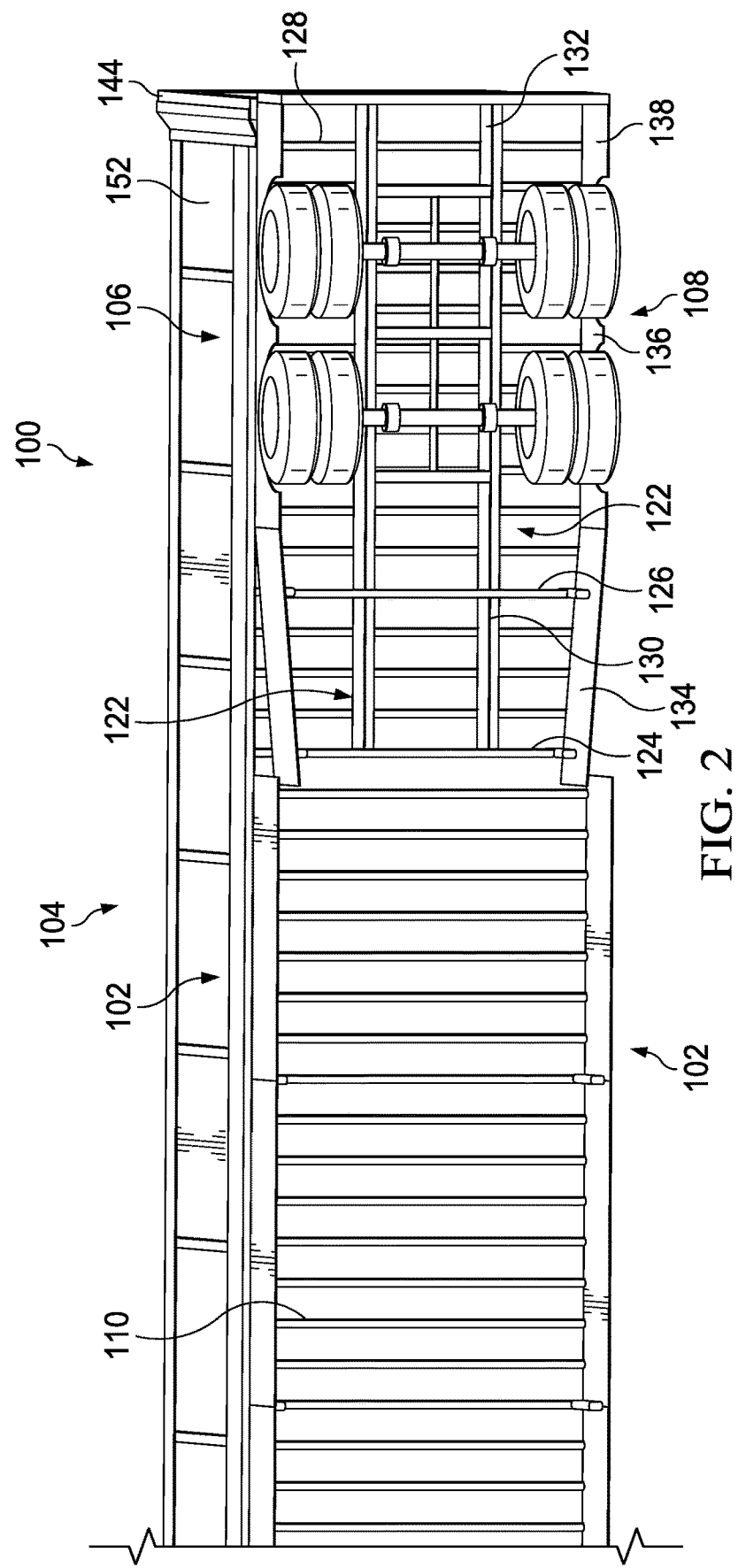
FIG. 2 representatively illustrates a bottom, perspective view of a trailer with an aerodynamic trucking system in accordance with an exemplary embodiment of the present technology.
Figure 3:
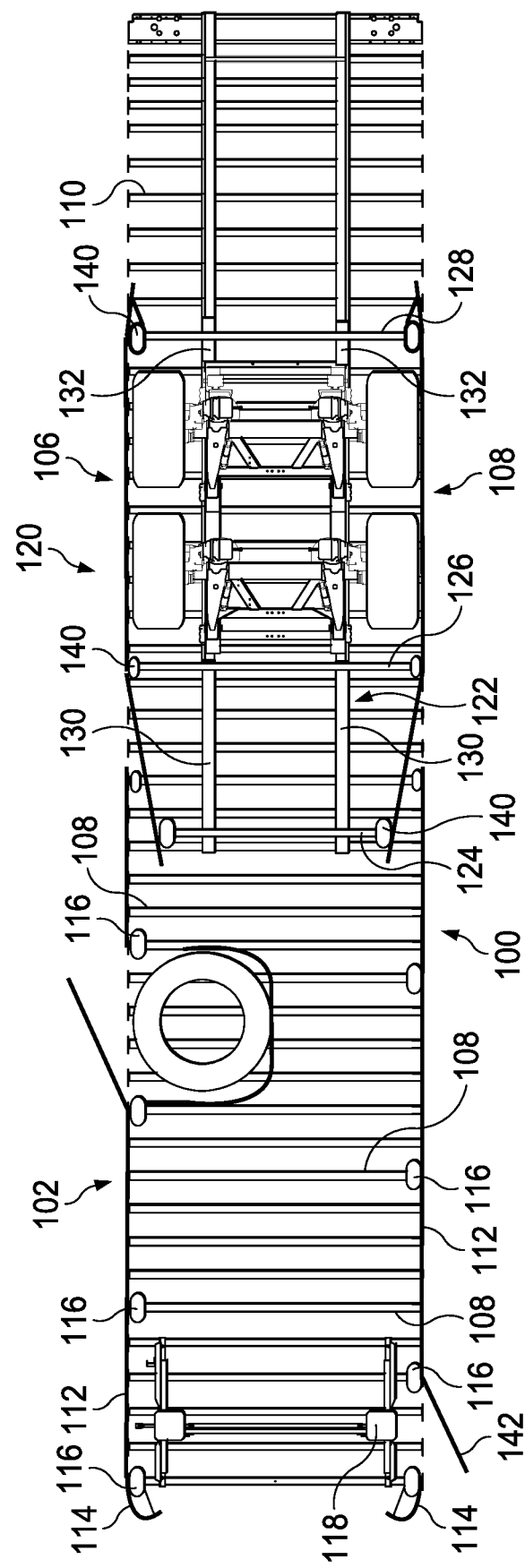
FIG. 3 representatively illustrates an partial bottom view of a trailer with an aerodynamic trucking system in accordance with an exemplary embodiment of the present technology.

Referring to FIGS. 1-3 a movable aerodynamic trucking system 100 is shown comprising a front skirt faring system 102 mounted to an undercarriage of a cargo trailer 104 and a movable skirt system 106 that is attached to a bogie 108 or any other component that may be adjusted longitudinally along the length of the trailer 104. The cargo trailer 104 may comprise a frame having a plurality of lateral cross-beams 110 and fixed longitudinal members (not shown). The fixed longitudinal members are welded to the lateral cross-beams 110. The bogie 108 is comprised of the wheels, frame, tires and axles, and the suspension system of the trailer. The bogie 108 is longitudinally adjustable by the driver/operator to accommodate various loading situations.

The movable aerodynamic trucking system 100 may be constructed of any suitable material. Each of the components may be constructed from industry-standard materials selected to comprise a structural rigidity sufficient to support the required air deflection function, while offering a level of mechanical flexibility sufficient to deflect resiliently under small to moderate impact loads, thereby reducing the need for frequent panel repair or replacement due to permanent impact damage. Materials suitable for use in the movable aerodynamic trucking system 100 may comprise, such as, for example, steel, steel composite, low-density steel composite, high-density steel composite, aluminum, aluminum composite, low-density aluminum composite, high-density aluminum composite, molded polymer panels, polymer-based composite panels, fiber-reinforced polymer panels, and injection molded polycarbonate, acrylonitrile butadiene styrene ("ABS") plastic, polypropylene, polyethylene, low-density polyethylene, high-density polyethylene, and polystyrene, polyvinyl chloride ("PVC") or any suitable combination or mixture thereof. In one embodiment, the material for the movable aerodynamic trucking system 100 may comprise an injection molded material. In one embodiment, the material for the movable aerodynamic trucking system 100 may comprise an injection molded mixture of polycarbonate and ABS plastic. In other embodiments, the material for the movable aerodynamic trucking system 100 may comprise an injection molded mixture of polycarbonate, ABS plastic, polypropylene and the like. One of ordinary skill in the art will appreciate that, under appropriate circumstances, considering such issues as cost, user preference, etc., other material selections for the movable aerodynamic trucking system 100 may be used. It should be understood to be highly beneficial for movable aerodynamic trucking system 100 to comprise light and more flexible materials, without exhibiting unstable behavior.

In general, the placement of the movable aerodynamic trucking system 100 may be symmetrical and generally parallel, although the angle may be adjusted depending of the specific trailer and or tractor-trailer combination, with respect to longitudinal axis of cargo-supporting floor deck.

Figure 4:
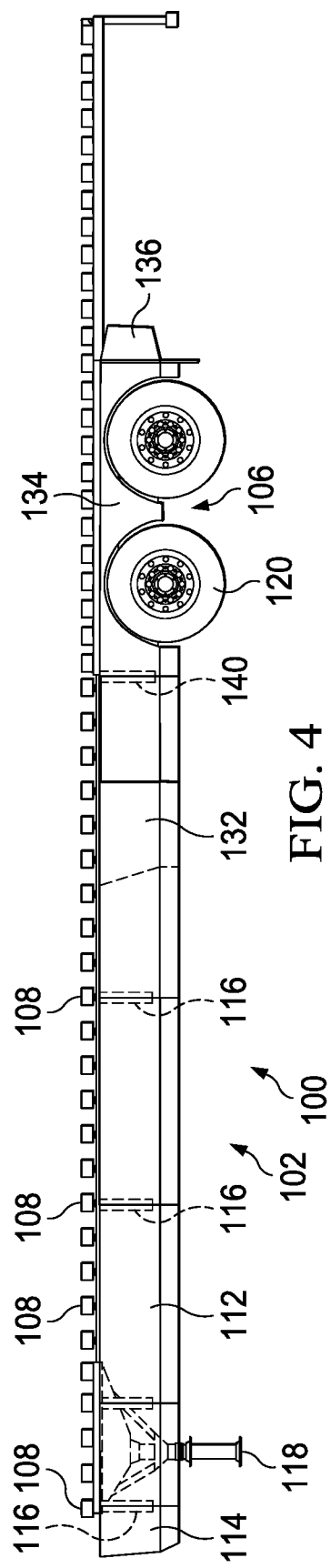
FIG. 4 representatively illustrates a partial side view of a trailer with an aerodynamic trucking system showing a rear skirt in a first position, in accordance with an exemplary embodiment of the present technology.

Referring now to FIGS. 3 and 4, the front skirt faring system 102 may comprise various combinations of a pair of side skirt fairings 112 and optionally a pair of front caps 114. As is understood these components, when combined provide a conventional side skirt. The front skirt faring system 102 may be sized appropriately and made of one or more than one components and constructed depending on any suitable configuration. The front skirt faring system 102 may be mounted to the lateral cross beams 108 by struts 116. Any suitable strut will suffice for mounting front skirt faring system 102 to the lateral cross beams 108 of the trailer. One example of a strut and front skirt fairing is shown in U.S. Patent Publication No 2018/0237081, which is incorporated by reference.

The front skirt faring system 102 is located just aft of the truck wheels and extends transverse of the centerline of the cargo trailer. The front skirt faring systems 102 may be substantially straight and run parallel to the centerline of the cargo trailer. Preferably, the front skirt faring system 102 comprise substantially planar external faces that are essentially solid (that is, impermeable to the passage of air).

In various embodiments, the components of the movable aerodynamic trucking system 100 are constructed to interconnect with one another by any known method. In various embodiments, the components may comprise any type of male to female, tongue and groove, and/or hand to glove connector configuration as understood by one of ordinary skill in the art. In various embodiments, the components may simply abut. Additionally, any of the side skirt fairings 112 and the front caps 114 may be connected to each other and/or one another in the manner described above and below.

Any combination of the side skirt fairings 112 and the front caps 114 may be contemplated. In one embodiment the side skirt fairings 112 and the front caps 114 are coupled together to comprise the front skirt fairing system 102. In one embodiment, the side skirt fairings 112 and the front caps 114 may comprise substantially planar external faces that are essentially solid (that is, impermeable to the passage of air). The side skirt fairings 112 and the front caps 114 may comprise a continuous single piece or multiple piece configurations. The front caps 114 may comprise any type of skirt that is curved inwardly toward the centerline of the trailer 104.

The front skirt faring system 102 may extend rearward from the front landing gear 118 on the trailer 104 to approximately a location forward of the rear wheels 120. In one embodiment, shown in FIG. 1, the front skirt faring system 102 may not cover the landing gear 118. In another embodiment, shown in FIGS. 3-5, the front skirt faring system 102 may cover the landing gear 118.

In one embodiment, the side skirt fairings 112 are substantially straight and run parallel to the centerline of the cargo trailer 102. In another embodiment the orientation of the side skirt fairing 112 may move outwardly from centerline from the front to the rear of the trailer 102. While not shown in the figures this orientation is understood by one of ordinary skill in the art.

Referring now to FIG. 3, the movable skirt system 106 extends rearward from front skirt faring system 102 to approximately the rearmost end of the cargo trailer, depending on the location of the bogie 108. The movable skirt system 106 is mounted to the bogie 108 by a rear frame 122. The rear frame 110 may comprise cross beams 124, 126, and 128 and forward and rear beams 130, 132.

Figure 5:
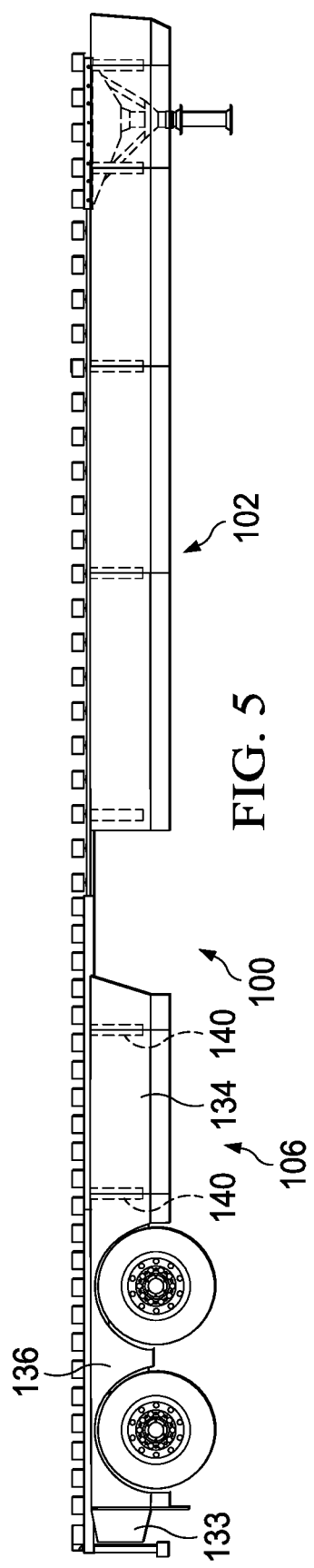
FIG. 5 representatively illustrates a partial side view of a trailer with an aerodynamic trucking system showing a rear skirt in a second position, in accordance with an exemplary embodiment of the present technology.

Referring now to FIGS. 4 and 5, in various embodiments, the movable skirt system 106 may comprise front panels 134, wheel panels 136, and rear panels 138. The panels may be connected to one another by any suitable method or may be an integral piece. The front panels 134, wheel panels 136, and rear panels 138 of the movable skirt system 106 may be coupled to the rear frame by struts 140. In one embodiment, the front panels 134 may be coupled to cross beams 124, 126 by strut 140. In one embodiment, the wheel panels 136 may be coupled to cross beam 126, 128 by strut 140. In one embodiment, the rear panels 138 may be coupled to cross beam 128 by strut 140.

As shown in FIG. 2, in various embodiments, the front end of the front panels 134 of the movable skirt system 106 may be located inwardly of the front skirt fairing system 102. As such, the movable skirt system 106 may be adjusted forward such that the front portion of the front panels 134 are covered by the rear portion of the front skirt fairing system 102. FIGS. 2 and 4 show the movable skirt system 106 may be adjusted forward such that the front portion of the front panels 134 are covered by the rear portion of the front skirt fairing system 102, while FIG. 5 shows the movable skirt system 106 may be adjusted rearwardly such that there is a gap between the front portion of the front panels 134 and the rear portion of the front skirt fairing system 102. While not shown, in one embodiment, front portion of the front panels 134 of the movable skirt system 106 may cover the rear portion of the front skirt fairing system 102. The movable skirt system 106 may be adjusted forward or rearward to accommodate any preference by the user or to conform to various state laws. For example the movable skirt fairing system 106 may be used in the "California Position" which is 40 feet from the kingpin to the center of the rear axle. The movable nature of the movable skirt fairing system 106 allows the rear wheels to be still include fairings when the wheels are moved forward and/or rearward and in any position therebetween.

The front panels 134 may be angled outwardly from the centerline of the cargo trailer 104 from the front end to the rear end where they abut the wheel panels 136. As shown in FIGS. 1 and 2, the wheel panels 136 may be oriented generally in line with the side of the cargo trailer. In standard configurations, the tires on the trailer wheels typically extend only to the outer base/trailer envelope of the cargo trailer. However, Federal law allows certain safety equipment devices, such as splash and spray suppression devices, to exceed the outer base/trailer envelope by no more than 3 inches. Thus a movable skirt system 106 that covers the tires on the trailer wheels would provide a benefit in aiding splash and spray suppression.

In various embodiments, the orientation of the movable skirt system 106 allows a portion or portions of the movable skirt system 106 to reside outside the outer base/trailer envelope. This angle of the front panels 134 may provide additional clearance for the wheel panels 136 to be located an additional distance outward of the front panels 134 to accommodate the trailer wheels. As such the linear path along the length of the cargo trailer 104 for the movable skirt system 106 may be located outward of the linear path of front skirt fairing system 102. As such, the orientation of the movable skirt system 106 allows the cargo trailer 104 to comply with Federal law. Examples of these types of designs are shown and further discussed in U.S. Pat. No. 10,189,514, which is incorporated by reference.

In various embodiments, the front skirt fairing system 102 is shown oriented parallel to the centerline of the cargo trailer. The front skit fairing system may also be oriented as shown in U.S. Patent Publication No 2018/0237081, which is incorporated by reference. The front skit fairing system may also be oriented as shown in U.S. Pat. No. 10,189,514, which is incorporated by reference.

In various embodiments, shown in FIG. 3, the front skirt fairing system 102 may comprise a door 142, for access the landing gear 118. The door 142 may be pivotably attached to the trailer 104 such that a portion of the side skirt fairing 112 the may rotate for access to the landing gear 118. The door 142 may be coupled to a strut 116 by a hinge or any other suitable rotational attachment component to allow the door 142/side skirt fairing 112 to open and rotate forwardly for access to the landing gear 118. The strut 116 may serve as the hinge for the door 142 to rotate about. The strut 116 may further be configured to serve as the frame for the door 142. The door 142 may be coupled to the strut 116 by any suitable attachment method including rivets, bolts, screws, and the like. The door 142 may be configured to provide additional aerodynamic benefit.

Figure 6:
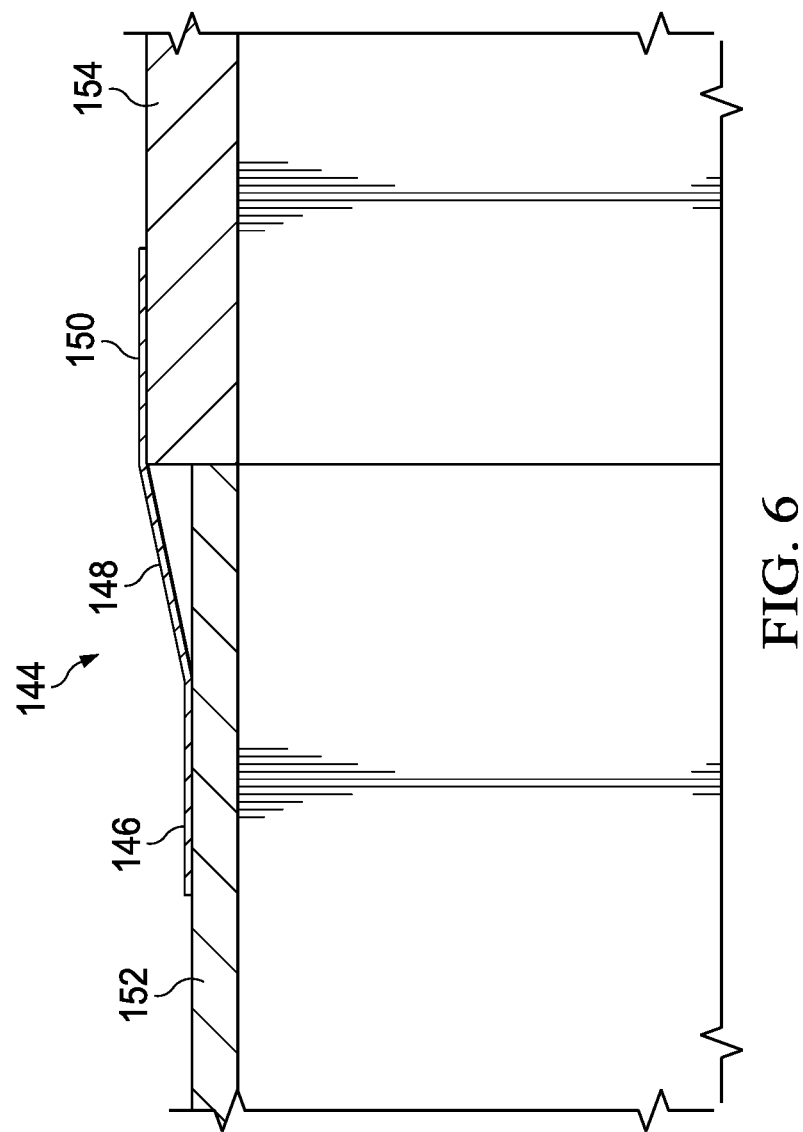
FIG. 6 representatively illustrates a cross section of a rear tail skirt in accordance with an exemplary embodiment of the present technology.

In various embodiments, shown in FIGS. 1, 2, and 6 an exit skirt faring 144 may be provided. The exit skirt faring 144 may be made of the same material as the skirt faring system 102 discussed above. In one embodiment, the exit skirt faring 14 may be constructed of a deformable material.

In one embodiment, the exit skirt faring 14 may be constructed of a deformable rubber material.

In various embodiments, the exit skirt faring 144 may comprise a forward panel 146, a transition 148, and a rear panel 150. In one embodiment, the forward panel 146 may be mounted to a side panel 152 of the cargo trailer 104. The rear portion may be mounted to a rear door frame 154 of the cargo trailer 104. The transition 148 is located between the front panel 146 and the rear panel 150 and is configured to allow for smooth airflow over the rear door frame 154. The transition 150 may be angled outwardly from the front panel 146 with respect to the centerline of the cargo trailer 104. In other words, to augment aerodynamic performance of the overall fairing assembly, a leading edge of each transition 148 may be canted outwardly at a suitable inclination. The angle of the transition 148 causes misdirection of the air prior to reaching the rear door frame 154 of the cargo trailer 104. It should be appreciated that the exit skirt fairing 144 may be coupled to the cargo trailer 104 along the side panels 152 of the cargo trailer and along a top panel 156 of the cargo trailer 104 to conceal the rear door frame 154.

In the foregoing description, the technology has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The invention claimed is:

1. An aerodynamic fairing assembly for attachment to a trailer of a tractor-trailer having a top, bottom, front, rear, a pair of sides, a trailer frame having a centerline, transverse structural support members extending between sides of the trailer, and longitudinal members extending along a length of the trailer, and a bogie having a rear frame and at least one rear wheel assembly situated below the trailer frame, the aerodynamic fairing assembly comprising:

a front skirt fairing comprising an inner surface and an outer surface;

a movable skirt fairing comprising an inner surface and an outer surface and coupled to the rear frame of the bogie, wherein the movable skirt is configured to move forward and rearward along the length of the trailer, and wherein a front portion of the movable skirt fairing is located inwardly of the front skirt fairing, and not cross the centerline of the trailer frame; and one or more mounting brackets configured to couple the front skirt fairing to one or more or of the transverse structural support members and the movable skirt fairing to the rear frame of the bogie.

2. The aerodynamic fairing assembly of claim 1, wherein the mounting brackets rotatably couple the front skirt fairing and the movable skirt fairing to one or more or of the transverse structural support members and the rear frame of the bogie.

3. The aerodynamic fairing assembly of claim 1, wherein mounting bracket comprises an upper mount coupled to the one or more or of the transverse structural support members and a lower mount coupled to the inner surface of the front skirt fairing and movable skirt fairing.

4. The aerodynamic fairing assembly of claim 1, wherein the front skirt fairing comprises a pair of front caps and a pair of side skirt fairings located on each side of the trailer.

5. The aerodynamic fairing assembly of claim 4, wherein each side skirt fairing is substantially straight and runs parallel to the centerline of the trailer.

6. The aerodynamic fairing assembly of claim 4, wherein each side skirt fairing is substantially straight and is angled outwardly from the centerline of the trailer along the longitudinal axis from a front edge to a rear edge of the side skirt.

7. The aerodynamic fairing assembly of claim 1, wherein the movable skirt comprises a front panel, a wheel panel, and a rear panel.

8. The aerodynamic fairing assembly of claim 7, wherein the front panel is angled inwardly toward the centerline of the trailer from a rear edge to a front edge of the front panel.

9. The aerodynamic fairing assembly of claim 8, wherein the front edge of the front panel is covered by the rear edge of the side skirt fairing.

10. The aerodynamic fairing assembly of claim 8, wherein the front edge of the front panel is not covered by the rear edge of the side skirt fairing.

11. The aerodynamic fairing assembly of claim 7, wherein a front edge of the front panel is located inwardly of a rear edge of the side skirt fairing.

12. The aerodynamic fairing assembly of claim 7, wherein the movable skirt comprises a front panel, a wheel panel, and a rear panel located on each side of the trailer.

13. The aerodynamic fairing assembly of claim 1, wherein the aerodynamic fairing assembly is constructed from an injection molded material.

14. The aerodynamic fairing assembly of claim 13, wherein the injection molded material comprises an injection molded mixture of polycarbonate and ABS plastic.

15. The aerodynamic fairing assembly of claim 7, wherein the front panel of the movable skirt covers a rear edged of the side skirt.

16. The aerodynamic fairing assembly of claim 1, further comprising an exit fairing system comprising:
- a forward panel;
- a transition; and
- a rear panel;
- wherein the forward panel is coupled to a pair of side panels and a top panel of the trailer and the rear panel is coupled to a rear door frame of the trailer.

17. An aerodynamic fairing assembly for attachment to a trailer of a tractor-trailer having a top, bottom, front, rear, a pair of sides, a trailer frame having a centerline, transverse structural support members extending between sides of the trailer, and longitudinal members extending along a length of the trailer, and a bogie having a rear frame and at least one rear wheel assembly situated below the trailer frame, the aerodynamic fairing assembly comprising:
- a front skirt fairing comprising an inner surface and an outer surface;
- a movable skirt fairing comprising a front panel, a wheel panel, and a rear panel and coupled to the rear frame of the bogie, wherein the front panel is angled inwardly toward the centerline of the trailer from a rear edge to a front edge of the front panel, wherein the movable skirt is configured to move forward and rearward along the length of the trailer, and wherein the front panel does not cross the centerline of the trailer frame;
- one or more mounting brackets configured to couple the front skirt fairing to one or more or of the transverse structural support members and the movable skirt fairing to the rear frame of the bogie.

18. The aerodynamic fairing assembly of claim 17, wherein the front edge of the front panel is covered by the rear edge of the front skirt fairing.

19. The aerodynamic fairing assembly of claim 17, wherein the front edge of the front panel is not covered by the rear edge of the front skirt fairing.

20. The aerodynamic fairing assembly of claim 17, wherein the front skirt fairing comprises a pair of front caps and a pair of side skirt fairings located on each side of the trailer.

21. The aerodynamic fairing assembly of claim 17, further comprising an exit fairing system comprising:
- a forward panel;
- a transition; and
- a rear panel;
- wherein the forward panel is coupled to a pair of side panels and a top panel of the trailer and the rear panel is coupled to a rear door frame of the trailer.

22. An aerodynamic fairing assembly for attachment to a trailer of a tractor-trailer having a top, bottom, front, rear, a pair of sides, a trailer frame having a centerline, transverse structural support members extending between sides of the trailer, and longitudinal members extending along a length of the trailer, and a bogie having a rear frame and at least one rear wheel assembly situated below the trailer frame, the aerodynamic fairing assembly comprising:
- a front skirt fairing comprising a front cap and a side skirt fairing, wherein the side skirt fairing is substantially straight and runs parallel to the centerline of the trailer;
- a movable skirt fairing coupled to the rear frame of the bogie comprising a front panel, a wheel panel, and a rear panel and, wherein the front panel is angled inwardly toward the centerline of the trailer from a rear edge to a front edge of the front panel and the front edge of the front panel is covered by a rear edge of the side skirt fairing, wherein the movable skirt is configured to move forward and rearward along the length of the trailer, and wherein the front panel does not cross the centerline of the trailer frame;
- one or more mounting brackets configured to couple the front skirt fairing to one or more or of the transverse structural support members and the movable skirt fairing to the rear frame of the bogie.

23. The aerodynamic fairing assembly of claim 22, further comprising an exit fairing system comprising:
- a forward panel;
- a transition; and
- a rear panel;
- wherein the forward panel is coupled to a pair of side panels and a top panel of the trailer and the rear panel is coupled to a rear door frame of the trailer.

* * * * *